Patented Dec. 25, 1928.

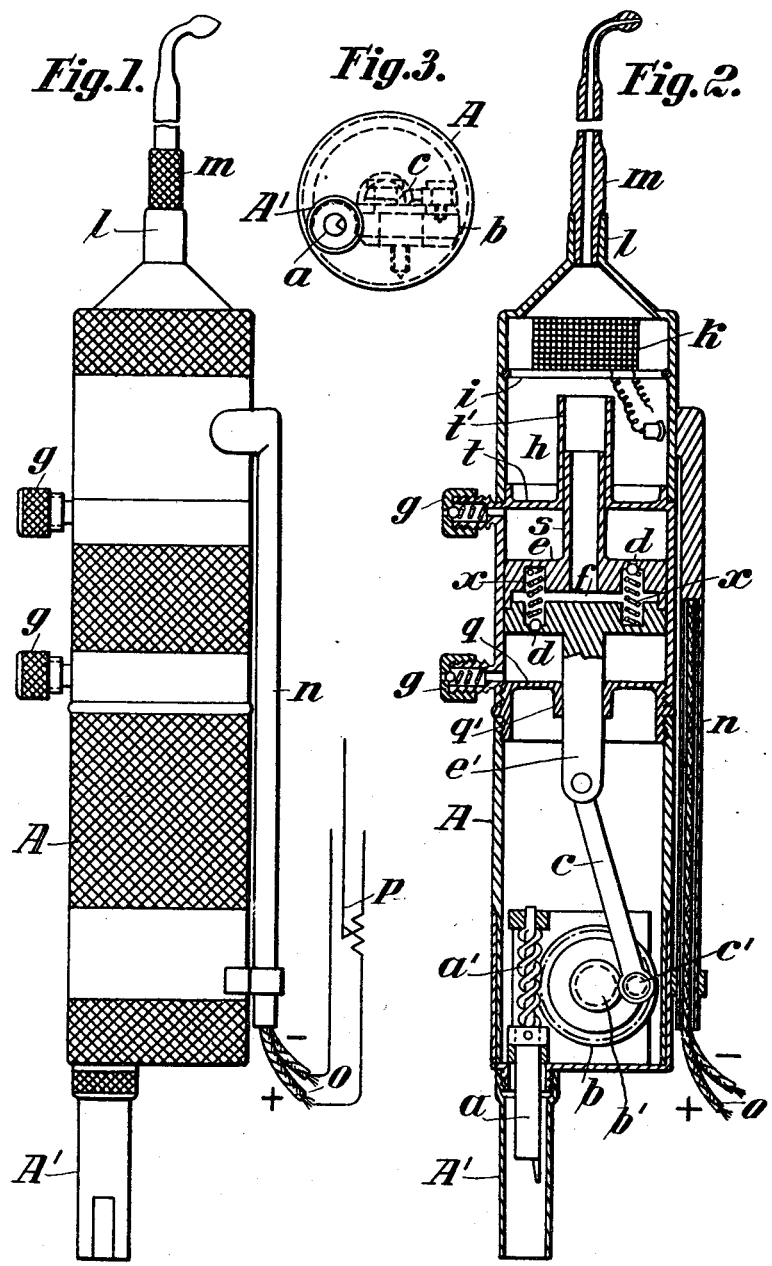

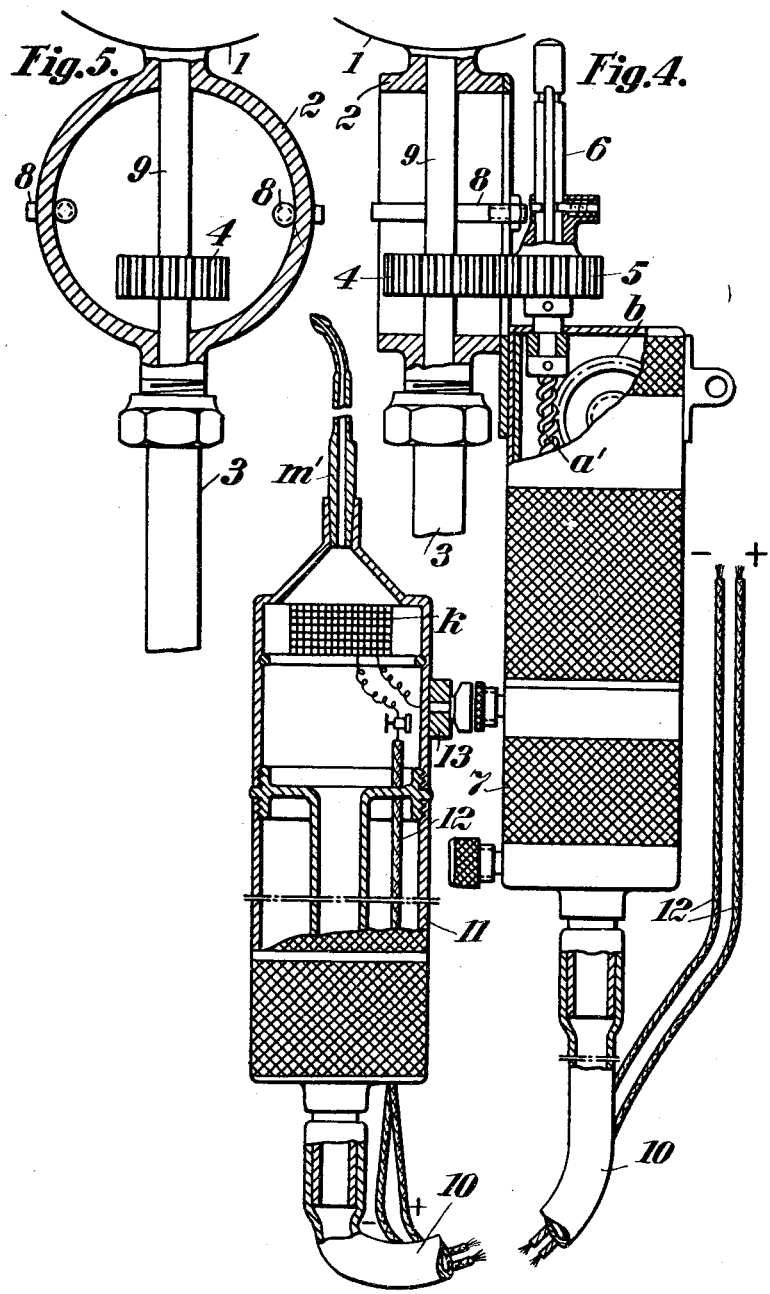

1,696,440

UNITED STATES PATENT OFFICE.

ALOYS LÜBKE, OF ALTENA, GERMANY.

AIR BLOWER FOR DENTAL PURPOSES.

Application filed December 5, 1927, Serial No. 237,868, and in Germany December 11, 1926.

This invention relates to a blower of hot and cold air for dental purposes driven directly or indirectly from the motor of a teeth boring-machine.

According to the present invention a worm is arranged on the frame of the air blower adapted to be connected to the driving means of the boring-machine, said worm by means of its worm wheel and of a connecting rod being capable to drive the piston rod of an air-pressure pump arranged in the air blower. The piston of the pump is preferably a double-acting one and has valves which automatically open and close alternately in the two directions of movement, the air being forced by said pump in a common channel guiding to the mouth piece.

The worm mounted on the frame of the air-blower may either be connected by a removable coupling element to the flexible shaft or the so-called drilling hose of a boring-machine or eventually, with interposition of gear wheels, directly to the driving shaft of the motor for said boring-machine. In the latter case the boring-machine and the air-blower can be used simultaneously.

Two embodiments of the invention are illustrated, by way of example, in the accompanying drawings in which:

Fig. 1 is a side elevation showing one form of construction of the air blower according to the invention.

Fig. 2 is a longitudinal section of Fig. 1.

Fig. 3 is a rear elevation of Fig. 1.

Fig. 4 is a side elevation partly in section showing an air blower of modified construction, a connecting hose and the leads for the electric heating current being partly broken away.

Fig. 5 shows partly in longitudinal section the coupling elements between the motor and the drilling hose.

In the form of construction shown in Figs. 1 to 3 the casing A of the air blower has on its rear end plate a tubular extension A' communicating with the interior of casing A. In the extension A' a coupling rod $a$ for the commonly used drilling hose is rotatably mounted. On the same axis with said rod $a$ a worm $a'$ is provided which meshes with a worm wheel $b$, keyed on an axle $b'$. To this worm wheel $b$ a connecting rod $c$ is hingedly connected by a pivot pin $c'$. On the other end of the connecting rod $c$ a piston rod $e'$ of a piston $e$ of a double acting air pressure pump is hinged. The piston rod $e'$ is guided in a bush $q'$ rearwardly extending from a transverse partition $q$.

In the piston $e$ two valves $d, d$ are arranged, each controlled by a spring $x$, said valves opening the one from the one side and the other from the other side of the piston $e$ into a channel $f$ of said piston. A sleeve $s$ communicates with this channel $f$ of the piston $e$, said sleeve being open at both ends and slidably engaging with a guide tube $t'$ mounted in a transverse partition $t$ of the casing A In the wall of the casing A suction valves $g, g$ are arranged one in front of and the other behind the piston $e$.

The channel $f$ in the piston $e$ communicates through the sleeve $s$ with the front- or heating-chamber $h$ of the air blower, in which a heating body $k$ is mounted on a ring $i$. In front of this heating body $k$ the conical front end of the casing A has a conical tube $l$ designed to receive an interchangeable mouth piece $m$.

Electric current is supplied to the heating body $k$ by conductors $o$ which are introduced into the casing A by means of an insulating tube $n$. A regulating resistance $p$ for the heating body $k$ is preferably connected with said conductors $o$.

The operation of the apparatus is as follows:—

From the flexible shaft of a teeth boring-machine the piston $e$ is moved to and fro through the intermediary of the driving means $a, a', b, c$ so that it sucks in fresh air through the suction valves $g, g$. The pressure produced by the stroke of the piston is transmitted through the valves $d, d'$ into the channel $f$ of the piston $e$ and through the sleeve $s$ into the heating chamber $h$ from which the air passes through the heating grate $k$ and the mouth piece $m$ to the point of application. The circuit for the heating body or grate $k$ may either be closed or interrupted so that the air is heated or not.

In the form of construction shown in Figs. 4 and 5 there designates 1 the driving mechanism for a dental boring-machine, 2 the coupling ring between the motor of this machine and the drilling hose, 9 the driving shaft for the drilling hose 3. On this driving shaft 9 a toothed wheel 4 is keyed within the coupling ring 2. With this toothed wheel 4 a pinion 5 meshes which is keyed on the driving spindle 6 of an air-compressor 7. This pinion 5 might be shiftable on the driving spindle 6, or the driving spindle 6 with this pinion might be shiftable in order to be able to disengage the wheels 4 and 5 and thereby to stop the air compressor. The driving elements 5 and 6 are detachably connected by means of screws 8 with the coupling ring 2.

The air compressor 7 is operated, as in the first form of construction above described, by a worm $a'$ forming an extension of the driving spindle 6 and meshing with a worm wheel $b$ of the compressor. The compressor might be double acting as that shown in Fig. 2, and it delivers an air current into a hose 10 when the pinion 5 is in engagement with the toothed wheel 4 and the driving shaft 6 of the compressor is driven from the motor not shown. The produced air current is heated electrically by a heating device $k$ arranged in a separate casing 11 connected by the hose 10 to the casing of compressor 7. The heating device is adapted to be started or stopped by means of a switch 13, which controls the conductors 12. The heated air flows into an interchangeable air nozzle or mouth piece $m'$.

The compressor 7 and its driving elements are detachably connected with the coupling ring 2, or with other elements of the mechanism for driving the drilling hose.

In this form of construction the drilling hose and the air blower are driven from one and the same driving engine, but are independent the one of the other, so that they may be used both at the same time. Either the drilling hose or the air blower may be stopped and the air blower and its driving elements might be completely detached.

Having now particularly described and ascertained the nature of my said invention, I declare that what I claim is:—

1. An air blower for dental purposes to be driven from the motor of a dental drill, said air blower having a casing, a revoluble worm, a worm wheel meshing with said worm, an air pump, a connecting rod for hingedly connecting said worm wheel with the piston rod of said air pump, all said parts being arranged within said casing, means for coupling said worm with the driving mechanism of a dental drill, said casing with said parts of the air blower arranged therein forming a compact structurally independent air blower, only connectible, for its drive, to the motor of a dental drill.

2. An air blower for dental purposes to be driven from the motor of a dental drill, said air blower having a casing, a revoluble worm, a worm wheel meshing with said worm, an air pump, a connecting rod for hingedly connecting said worm wheel with the piston rod of said air pump, all said parts of the air blower being arranged within said casing, means for coupling said worm with the driving mechanism of a dental drill, said casing with said parts of the air blower arranged therein forming a compact structurally independent air blower, only connectible, for its drive, to the motor of a dental drill.

3. An air blower for dental purposes to be driven from the motor of a dental drill, said air blower having a casing, a revoluble worm, a worm wheel meshing with said worm, an air pump, a connecting rod for hingedly connecting said worm wheel with the piston rod of said air pump, all said parts being arranged within said casing, means for coupling said worm with the driving shaft of the motor of a dental drill directly, said casing with said parts of the air blower arranged therein forming a compact structurally independent air blower, only connectible, for its drive, to the shaft of the motor of a dental drill.

4. An air blower for dental purposes to be driven from the motor of a dental drill, said air blower having a casing, a revoluble worm, a worm wheel meshing with said worm, an air pump, a connecting rod for hingedly connecting said worm wheel with the piston rod of said air pump, all said parts being arranged within said casing, means for coupling said worm with the driving mechanism of a dental drill, a casing, a revoluble worm within said casing, a gear-wheel transmission, one of the gears of said transmission being arranged on the shaft of said worm on the outside of said casing, a worm wheel meshing with said worm within said casing, an air pump arranged in said casing, a connecting rod for hingedly connecting said worm wheel with the piston rod of said air pump, means for coupling said gear-wheel transmission with the driving shaft of a dental drill, said casing with said parts of the air blower arranged therein forming a compact structurally independent, air blower, only connectible, for its drive, to the driving shaft of a dental drill.

5. An air blower for dental purposes to be driven from the motor of a dental drill, said air blower having a casing, a revoluble worm, a worm wheel meshing with said worm, an air pump, a connecting rod for hingedly connecting said worm wheel with the piston rod of said air pump, all said parts being arranged within said casing, means for coupling said worm with the driving mechanism of a dental drill, a casing, a revoluble worm within said casing, a gear-wheel transmission, one of the gears of said transmission being arranged on the shaft of said worm on the outside of said casing, a worm wheel meshing with said worm within said casing, an air pump arranged in said casing, a connecting rod for hingedly connecting said worm wheel with the piston rod of said air pump, means for coupling said gear-wheel transmission with the driving shaft of a dental drill, said casing with said parts of the air blower arranged therein forming a compact structurally independent air blower, only connectible, for its drive, to the driving shaft of a dental drill.

6. An air blower for dental purposes to be driven from the motor of a dental drill, said air blower having a casing, a revoluble worm, a worm wheel meshing with said worm, an air pump, a connecting rod for hingedly connecting said worm wheel with the piston rod of said air pump, all said parts being arranged within said casing, means for coupling said worm with the driving mechanism of a dental drill, means for disengaging said worm from the driving elements of the dental drill, said casing with said parts of the air blower arranged therein forming a compact structurally independent air blower, only connectible, for its drive, to the motor of a dental drill.

In testimony whereof I have hereunto set my hand.

ALOYS LÜBKE.